United States Patent [19]

Gammell

[11] Patent Number: 4,837,578
[45] Date of Patent: Jun. 6, 1989

[54] APPARATUS AND METHOD FOR RANGE DETECTION USING THE ANALYTIC SIGNAL IDENTIFIED FROM THE RECEIVED SIGNAL

[75] Inventor: Paul M. Gammell, Altadena, Calif.
[73] Assignee: California Institute of Technology, Pasadena, Calif.
[21] Appl. No.: 316,145
[22] Filed: Oct. 29, 1981
[51] Int. Cl.[4] .................. G01S 11/00; G01S 13/10; G01N 22/02; G01N 29/04
[52] U.S. Cl. ............................ 342/194; 342/192; 342/134; 342/22; 342/450; 73/602; 73/606; 367/7; 367/99; 367/127; 364/725; 364/826
[58] Field of Search ............... 73/620, 598, 600, 602, 73/603, 606; 378/96; 367/7, 8, 99, 100, 118, 124, 128; 342/118, 134, 135, 192, 194, 195, 196; 364/826, 600; 358/106; 343/112 C, 17.1 PF, 12 R, 17.7, 5 NQ, 7.7, 5 FT, 7.5, 455, 5 SA, 5 DP, 13 R, 17

[56] References Cited

U.S. PATENT DOCUMENTS

| | | | |
|---|---|---|---|
| 2,099,536 | 11/1937 | Scherbatskoy et al. | 367/47 |
| 3,183,504 | 5/1965 | Graham | 343/7.5 |
| 4,114,153 | 9/1978 | Neidell | 343/9 |
| 4,121,212 | 10/1978 | Taylor, Jr. | 343/7.7 |
| 4,207,620 | 6/1980 | Morgera | 367/92 |
| 4,279,019 | 7/1981 | Heyser | 367/102 X |
| 4,315,263 | 2/1982 | Neidell | 343/112 C |
| 4,373,190 | 2/1983 | Lewis et al. | 343/5 FT |
| 4,445,189 | 4/1984 | Hyatt | 364/600 |

OTHER PUBLICATIONS

Heyser, R. C., "Determinations of Loudspeaker Signal Arrival Times: Part III.," J. Audio Engineering Society, vol. 19, (1971) pp. 902–905.
Thomsen, C. and Hee, J., "Analysis of Non-Stationary Signals-Digital Filters vs. FFT," IEE International Conference ASSP Atlanta, Georgia, Mar. 30–Apr. 1, 1981.
Gabor, D., "Theory of Communication," J. of the Institute of Electrical Engineers, vol. 93, pp. 439–440, (London 1946).
Dome, R. B, "Wide Phase Shift Networking" Electronics Manual for Audio Engineers, Vin Zeleiff and John Markus, Ed., pp. 144–148 (McGraw-Hill, 1949).
Heyser, R. C., "Some Useful Graphical Relationships," J. Audio Engineering Society, vol. 23, pp. 562–565 (1965).
Newsome et al., "Analytical Models For Chirp-Signal Compression and Dispersion", $U_2$ Int. J. Electronics, vol. 47, No. 2, 1979, pp. 171–179.
Heyser, R. C., "Detection of Thrombus on Heart Valve Cages by Reverberation," 25th Annual Convention of the American Institute of Ultrasound in Medicine, Sep. 15–19, 1980, New Orleans, LA.
Heyser, R. C., "Acoustical Measurements by Time Delay Spectrometry," J. Audio Engineering Society, vol. 15, pp. 370–382 (1967).

(List continued on next page.)

Primary Examiner—Thomas H. Tarcza
Assistant Examiner—Gilbert Barrón, Jr.
Attorney, Agent, or Firm—Jackson & Jones

[57] ABSTRACT

A method and apparatus for use in a pulse-echo imaging or ranging system comprising means (32) for identifying the analytic signal from a received signal and means (34) for extracting ranging information from the analytic signal. The analytic signal can be obtained and processed by digital or by analog circuit means. One embodiment of the analog circuit means (32) includes means (90) for modulating the received signal on a carrier frequency, means (92) for obtaining a single sideband signal from the modulated signal and means (94) for envelope detecting the single sideband signal. Another embodiment of the analog circuit means (32) includes various means (60), using coherent modulation techniques, for obtaining the quadrature components of the received signal, means (62) for squaring each of the quadrature components, means (64) for obtaining the sum of the squared quadrature components, and, if desired, means (66) for obtaining the square root of the sum, which is the magnitude of the complex analytic signal.

28 Claims, 6 Drawing Sheets

OTHER PUBLICATIONS

Heyser, R. C. and Le Croissette, D. H., "A New Ultrasonic Imaging System Using Time Delay Spectrometry," Ultrasound in Medicine and Biology, vol. 1, pp. 119–131 (1974).

Fryer & Lee, "Use of Tapped Delay Lines in Loudspeaker Work (Abstract)," vol. 28, Journal of the Audio Engineering Society, pp. 374 (May 1980).

H. Seiger, "Comparison of Three Flaw-Location Methods for Automated Ultrasonic Testing" NDT International, Jun. 82, pp. 131.

Vyas et al., *Performance Evaluation of a New Robust Detector for Sonar Signals,* Conf. ICASSP 81, Atlanta, Georgia, U.S.A., 171–175.

APPARATUS AND METHOD FOR RANGE DETECTION USING THE ANALYTIC SIGNAL IDENTIFIED FROM THE RECEIVED SIGNAL

BACKGROUND OF THE INVENTION

This application discloses the results of one phase of research carried out at the Jet Propulsion Laboratory, California Institute of Technology under contract no. NAS7-100, sponsored by the National Aeronautics and Space Administration, and is subject to the provisions of Section 305 of the National Aeronautics and Space Act of 1958, Public Law 85-568 (72 Stat. 435; 43 U.S.C. §2457).

The present invention relates to a method and apparatus for the processing of a complex waveform, e.g., an ultrasonic waveform, which constitutes a received reflective echo or transmissive signal in a passive or pulse-echo ranging or imaging system. Examples of such systems are radar, sonar, including medical ultrasound applications, and other pulse-echo systems which could, e.g., employ pulses of laser light energy.

In a conventional pulse-echo system the received signal, e.g., as reflected from a reflecting surface in the propogation medium, is rectified and smoothed. It is a well known problem that the predominant frequency of the pulse-echo system, which in the case of a medical ultrasound system would be an ultrasonic frequency, is modulated onto the signature of the reflecting surface, which is an interface within the propagation medium. Interpretation of the received data signal is thus made more difficult, particularly in resolving a distinction between the location of multiple reflecting interfaces which are closely spaced within the propagation medium. In the medical ultrasound context this could relate to multiple interfaces due to tissue structure. In the echo-ranging sonar context this could result from, e.g., a target located spatially close to another target or to the bottom of the ocean. In the radar context this could result, e.g., from multiple closely spaced targets.

An anayltic signal is well known in the part and is defined in my paper entitled "Improved Ultrasonic Detection Using the analytic signal magnitude," Ultrasonics, Vol. 9, p. 73 (March 1981) based upon D. Gabor's paper entitled "Theory of Communication," *J. Inst. Electrical Engineers,* (London) 93 (1946) pp 429–457. That anayltic signal, coined by Gabor, the mathematical function which results from treating an electronic signal by replacing the real signal component by a complex form. For example, with a simple harmonic function the real signal $$f(t) = a \cos \omega t + b \sin \omega t$$

(where a and b are real constants) is replaced by the complex form $$h(t) = f(t) + ig(t) = (a - ib) \exp(i\omega t)$$

This mathematic definition and all known properties of an analytic signal are discussed in numerous tests and articles and are discussed in more detail hereinafter.

It is known in the art, from Heyser, "Determination Loudspeaker Signal Arrival Times: Part III," appearing Vol. 19 of the *Journal of the Audio Engineering Society* at "Heyser I"), that the square of the analytic signal magnitude is proportional to the rate of arrival of energy and is not modulated by the transmitting-receiving transducer/antenna resonant frequency. It is also known in the art of signal processing that the analytic signal is a useful signal for time delay spectrometry. See Heyser, "Acoustical Measurements by Time Delay Spectrometry," Volume 15, No. 4, Journal of the Audio Engineering Society, p. 370 (1967) (hereinafter "Heyser II"), and Heyser and Le Croissett, "A New Ultrasonic Imaging System Having Time Delay Spectrometry," Volume 1, *Ultrasound in Med. & Biol.,* pp. 119–131 (1974) (hereinafter "Heyser III").

It is known in the art to provide closer estimation of interface location in some situations by means of deconvolution. However, deconvolution requires precise phase information and is sensitive to noise and distortions introduced by the propogation medium. As is known in the art, the ability to perform analytic signal processing depends only upon the causality relations, a sufficient condition for these to hold being that the square of the quantity be proportional to an energy density and that the total energy be finite. See Heyser I, supra. Even with distortion present, due to the propogation medium, Heyser I teaches that the analytic signal still faithfully represents the rate-of-arrival of energy at the transducer/sensor and the analytic signal magnitude of the received energy "packet" can still be computed.

The applicant has reported in "Improved Ultrasonic Detection Using the Analytic Signal Magnitude" *Ultrasonics* Vol. 9, p. 73 (March 1981) (the disclosure of which is hereby incorporated by reference) that when the analytic signal magnitude is employed as a measure of interface location, the resolution is diminished only by the effect of the medium on the propagated energy packet and not by the limitations of the detection scheme.

Means are available for obtaining the analytic signal magnitude using digitized analog data received at the transducer, through fast Fourier Transformation, and, in particular, which are facilitated by use of an array processor. It has also been known to use a fast Fourier Transform system for the computation of analytic signal magnitude in audio frequency data.

However, high-speed analog to digital converters and memories are very expensive and have some definite speed limitations. This latter makes it difficult or impossible to practically analyze the received data in real-time, or even nearly-real-time. Digital converters also lack the dynamic range of a strictly analog system and can induce quantization noise. Furthermore, their resolution is usually further compromised when operating anywhere near their specified frequency limit, at least with state-of-the art units.

SUMMARY OF THE INVENTION

The applicant in his above noted paper, in pointing out that the analytic signal magnitude is an optimal estimator, in the mean square sense, for interfaces in pulse-echo systems, e.g., sonar and radar, has reported, based upon the prior work of Heyser, noted above, that envelope detection of the magnitude of the analytic signal is useful in, e.g., pulse-echo ranging and imaging systems. It is also useful in systems which process a passively received signal. More particularly such systems process received signals to determine information related to the energy contained in the received signal.

The present invention thus seeks to make use of the advantages of employing the analytic signal for, e.g., interface location and resolution in a pulse-echo system. In addition the present invention also relates to a totally analog means of measuring the analytic signal magnitude. This avoids the problems associated with converting the analog signal to a digital signal prior to data processing.

More specifically the analog means of the present invention relates to deriving the quadrature components of the analytic signal. This is accomplished, e.g., in the frequency domain by modulating the received signal onto a higher frequency carrier and filtering out the lower (or upper) sideband, and obtaining the analytic signal from the upper (or lower) sideband. This can be done by, e.g., converting the single sideband back to baseband in a balanced mixer, with the phase of the heterodyning frequency being appropriate for obtaining a signal in quadrature with the original signal. This is then followed by a low-pass filter to remove the sum frequency, and addition of the squares of these quadrature components (i.e., the original signal and its Hilbert Transform). This produces the square of the magnitude of the analytic signal. A square root operation can be performed by analog circuitry if desired. It is also possible to obtain the quadrature components by phase shifting one sideband +90° and one sideband −90°, which corresponds to multiplication by i sgn(f) in the frequency domain, followed by demodulation a frequency that is coherent with the original modulation frequency. This operation produces the quadrature components. From the two quadrature components the analytic signal magnitude can be computed. Alternatively, if the carrier is sufficiently greater in frequency than the baseband frequency, the analytic signal magnitude can be obtained by peak detecting the single sideband signal to form the envelope of the single sideband signal, which is envelope proportional to the magnitude of analytic signal.

The above noted problems existing in the art have been given in order to illustrate some of the problems which detract from the utility of existing pulse-echo systems which employ a rectified and smoothed received signal for interface location and resolution. a brief summary of the invention has been given so that the more detailed disclosure of the invention can be better understood and the contribution to the art of the applicant's invention better appreciated. There are, of course, additional features of the present invention which will be described hereinafter and which will form the subject matter of the appended claims. These will become apparent with reference to the following detailed description of the preferred embodiments of the present invention, in connection with the accompanying drawings, wherein like reference numerals have been applied in the various FIGURES to like elements.

DETAILED DESCRIPTION OF THE DISCLOSURE

Figure 1:
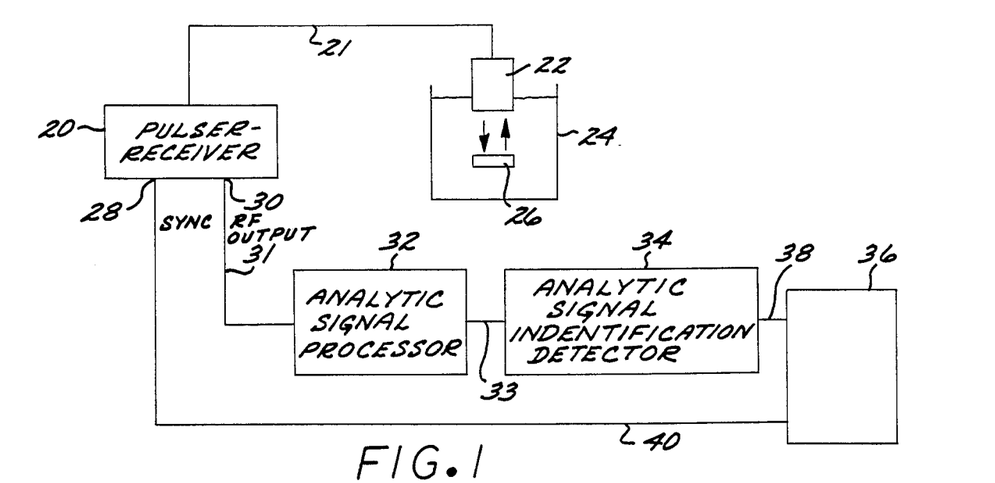
FIG. 1 shows a block diagram of the apparatus according to the present invention for pulse-echo ranging by use of the analytic signal of an ultrasonic pulse-echo system.

Turning first to FIG. 1, a block diagram of a pulse-echo system according to the present invention is shown. A conventional pulser-receiver 20 is connected by line 21 to a conventional transducer 22 placed, e.g., in a container 24 containing a propagation medium. In the propagation medium, e.g., water, is located a target 26 which reflects back to the transducer 22 the energy output into the propagation medium by the transducer 22 in response to pulses generated by the pulser-receiver 20. The pulser-receiver 20 receives the echo pulse energy which is altered by the effects of the propagation medium and the above noted target reflection modulation, or which may contain multiple target echos from, e.g., different interfaces in the target 26, or the target 26 and the bottom of the container 24.

The received echo pulse energy is output from the RF output 30 of the pulser-receiver 20 and is coupled by line 31 to an analytic signal processor 32.

The analytic signal output of the analytic signal processor 32 is output on line 33 to an analytic signal range information identifier 34. The analytic signal range information identifier 34 may, for example, detect the occurrence of a peak in the analytic signal and provides an output on line 38 to the "vertical in" of a range computer 36. Included within the analytic signal range information identifier 34, which operates to detect, e.g., a peak in the analytic signal, may be a rectifier (not shown) to rectify the analytic signal before peak detection. It will be understood by those skilled in the art that the analytic signal may contain two or more information bearing characteristics, i.e., peaks in the case of the use of peak detection. These may represent the location of multiple targets or multiple interfaces within a body being examined. The latter case is an example of medical ultrasound imaging techniques, wherein the multiple echo peaks would be. present in the analytic signal, each representing the location of a different interface in the body being examined.

The range computer 36 computes the range to the interface corresponding to the particular analytic signal peak as is well known in the pulse-echo imaging and ranging art, by comparing the occurrence of the analytic signal peak to the occurrence of a synchronizing pulse generated by the pulser-receiver 20 and coupled on line 40 to the range computer 36. It will also be understood by those skilled in the art that a pulser-receiver 20, per se, is not necessary to the present invention. The present invention is very useful in the case of pulse-echo ranging and imaging systems employing a pulser-receiver 20, but could also be used for signal processing in other types of systems where the received signal energy does not result from a reflective or transmissive pulse originating in a pulser-receiver 20. Further, the synchronizing pulse need not be a separate pulse generated by, e.g., the pulser-receiver 20. In medical ultrasound applications, e.g., the transducer might be placed on a patient's skin and the comparison made between a first echo from the skin and the location of subsequent echos defining interfaces, which would locate the interfaces with respect to the skin or surface of th examined. In the present application "synchronizing pulse" will be used to encompass both a conventional synchronizing pulse as is known in the art, e.g., in radar and sonar applications, and any other time base information pulse contained in the received signal which is used, as is known in the art, as a data reference for obtaining ranging or imaging information from the remainder of the received signal.

Figure 2:
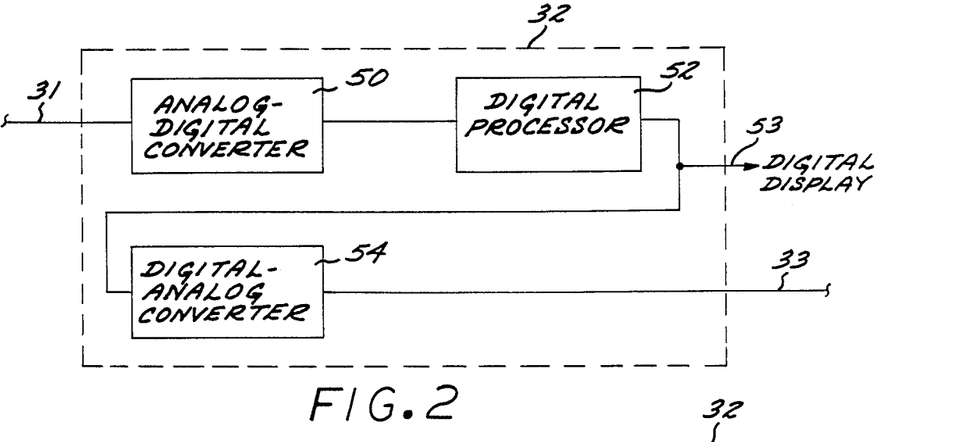
FIG. 2 shows a block diagram of a digital signal processing system, which shows the use of digital data processing techniques as reported in the applicant's above noted paper.

In FIG. 2 a block diagram is shown in which the analytic signal is derived from the received signal by digital data processing as is reported in the applicant's above noted prior paper. The analytic signal processor 32, as shown within the phantom lines of FIG. 2, includes an analog-to-digital converter 50 which converts the analog received signal to its digital representation. This digital representation is fed to a suitable data processor 52 which is programmed to perform a Fast Fourier Transformation on the digital representation of the received signal, and may conveniently be an array processor, or any suitable conventional microprocessor. This is more fully explained in the applicant's paper "Improved Ultrasonic Detection Using the Analytic Signal Magnitude" appearing on pages 73-76 in Vol. 19 of Ultrasonics (March 1981), the disclosure of which is hereby incorporated by reference. The digitally transformed received signal is now the analytic signal, which may be converted back to analog in a digital-to-analog converter 54 and coupled onto line 33 for transmission to the peak detector 34 (shown in FIG. 1). The digital signal may be displayed by itself or further processed digitally, as is shown in FIG. 2 by line 53 leading to, e.g., a digital display.

The analytic signal magnitude is more readily and accurately determined by strictly analog means. This can be accomplished, as discussed above, either in the time or frequency domain.

In the time domain the quadrature component of the received RF signal, which RF signal is the output at 30 of the pulser-receiver 20, is obtained, e.g., by a Hilbert Transform. A Hilbert Transform is a convolution of received signal with the kernel $1/(t-t_0)$ which produces a 90° phase shift of all frequency components of the signal without changing their amplitude. A circuit for the implementation of the Hilbert Transform is shown, e.g., in Dome, "Wideband Phase Shift Networks" appearing in *Electronics Manual for Radio Engineers*, Vin Zeluff and John Markus Editors at 144-148 published by McGraw-Hill (1949), the disclosure of which is hereby incorporated by reference. Such circuits are all-pass, non-minimal phase circuits.

A so-called "Dome" circuit derives, from a given voltage, two new voltages of the same frequency but with the phase angle between the new voltages held substantially constant over a wide frequency range. These new voltages each have an amplitude characteristic which is linearly variable with the amplitude of the input voltage independently of frequency. Two networks whose phase angles increase substantially linearly with the logarithm of the frequency are used to produce the phase difference between the two voltages. By properly matching the two networks, the phase difference between the two networks remains nearly constant over a wide range of frequency.

Figure 3:
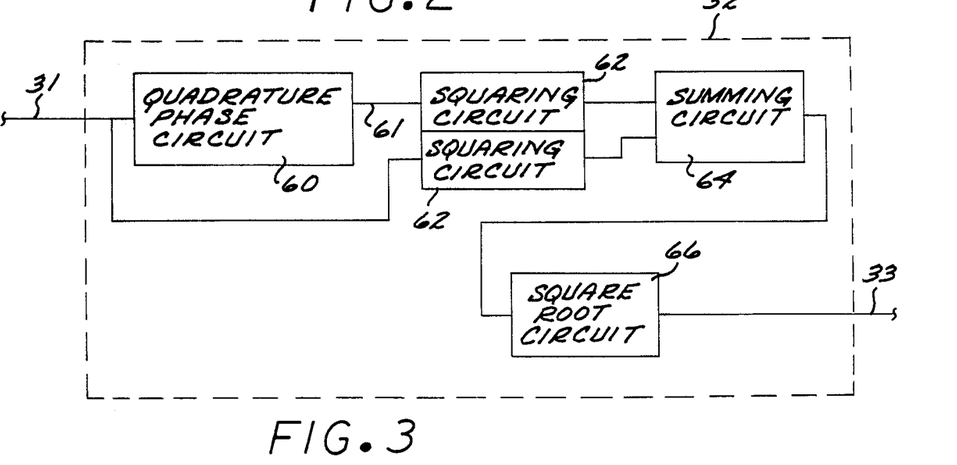
FIG. 3 shows a block diagram of a portion of the system of FIG. 1, which shows the generation of the analytic signal by obtaining a pair of quadrature components of the received signal, squaring them, summing the squares and taking the square root of the resultant squared signal.

FIG. 3 shows in more detail the system of FIG. 1 in which such a "Dome" circuit is employed. FIG. 3 shows a portion of the system of FIG. 1, in which one embodiment the analytic signal processor 32, shown within the phantom lines in FIG. 3 is presented in more detail. The analytic signal processor 32 is shown to include a quadrature phase circuit 60, which may be, e.g., a "Dome" circuit. The quadrature phase circuit 60 is coupled on its input by line 31 to the RF output 30 of the pulser-receiver 20, and is coupled on its output by line 61 to one of a pair of conventional analog squaring circuits 62. An input of the other of the pair of squaring circuits 62 is the received signal from line 31. The squaring circuits 62 square each of the signals input thereto and provide a pair of outputs which are the squares of quadratures components of the received signal. These are input into a conventional analog summing circuit 64 and the resultant sum is input into a conventional analog square root circuit 66, the output of which on line 33 is the analytic signal magnitude. The analytic signal magnitude on line 33 is input into the analytic signal identification circuit 34 (shown in FIG. 1). It will be understood by those in the art, that the square of the analytic signal could also provide useful information, and the square root need not necessarily be taken in a circuit such as 66. For example, square root circuit 66 could be replaced by a conventional analog circuit for converting the square of the analytic signal magnitude to the log of the analytic magnitude.

Figure 4:
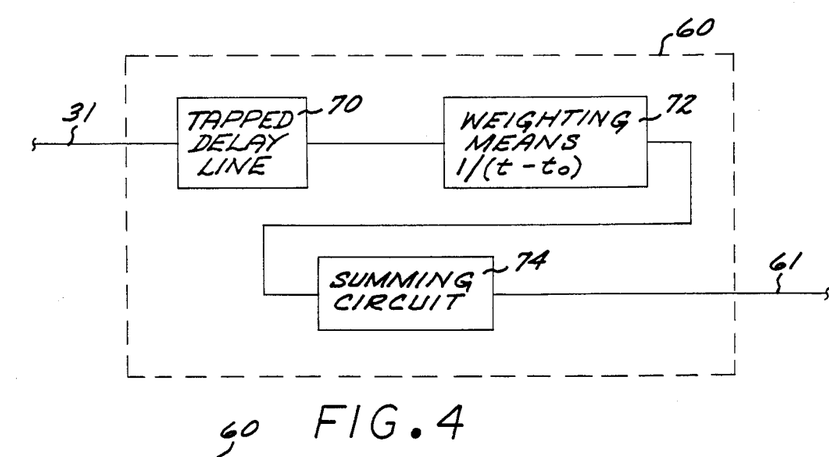
FIG. 4 shows a portion of the system of FIG. 3, which shows one possible manner of obtaining the quadrature component of the received signal by the use of well known means of delay line tapping and summing a plurality of weighted, delay line taps.

Alternatively, the Hilbert Transform of an analog signal may be obtained by using a well known tapped delay line and weighted summing of the taps to approximate the function $1/(t-t_0)$. Such a circuit is similar to a mechanical scheme proposed by Gabor, "Theory of Communication" published in the *Journal of the Institute of Electrical Engineers*, Vol. 93 pages 429–57 (1946), which on p. 439 discloses recording the signal optically on a phosphorescent drum, then reading a delayed version integrated with the $1/(t-t_0)$ weighting function by subtracting the outputs of a pair of photodiodes masked with apertures that approximate the $1/(t-t_0)$ weighting. Another example of this technique may be found in Fryer & Lee, "Use of Tapped Delay Lines in Loudspeaker Work," Rank Hi Fi, Idle, Bradford, W. Yorks, Volume 29, *Journal of the Audio Engineering Society*, p. 374 (1980). Such a circuit is shown in block diagram form in FIG. 4. The quadrature phase circuit 60 of FIG. 3 is shown in FIG. 4 to include a tapped delay line 70 coupled to line 31, the output of which is a plurality of delay line tapped signals which are input into a weighting means 72 which weighs each of the delay line tapped signals according to the function $1/(t-t_0)$, where $t_0$ is the time of the middle delay line tap and t is the time of the delay line tap being weighted. A similar result can be achieved using charged coupled devices to obtain analog samples of the signal with various delays, which are then continuously summed with weighting by the function $1/(t-t_0)$ to approximate the Hilbert Transform.

In the frequency domain the technique noted above in connection with the digital implementation of the present invention, more fully set forth in the above noted paper of the applicant, can also be used. That is, after the digitized real signal is transformed to the frequency domain, the quadrature components are obtained by multiplying the spectrum (frequency domain representation) of the signal by i sgn(f), where sgn(f)=$-1$ for f less than 0, =1 for f greater than or equal to 0, and taking the inverse Fourier Transform to obtain the quadrature component. An alternative method is to suppress the negative frequency components, i.e., set them equal to zero and take the inverse Fourier Transform, which results in the production of both quadrature components of the full analytic signal.

Such a discrimination between positive and negative frequency components is quite difficult in an analog circuit. It can be simplified, however, by modulating the signal on a higher frequency carrier, thus making the negative frequency components of the baseband signal the lower sideband of the modulated signal. By use of a balanced modulator the carrier can be suppressed, leaving only the upper and lower sidebands. The upper or lower sideband can then be filtered out. However, a filter capable of removing either sideband without distortion of the amplitude and/or phase of the remaining sideband requires careful design. Such a filter must, in filtering out, e.g., the lower sideband, sacrifice the lowest frequencies of interest, which are close to the carrier. The filter must have a time delay equal to at least half the time interval over which the Hilbert-Transform is to be approximated, since the Kernel $1/(t-t_0)$ is symmetric in time displacement and no physical device can predict the future. The resulting single sideband signal is converted back to baseband and, thereafter, the analytic signal is e.g., peak detected.

With only a trivial phase difference, the results are the same whether the upper or lower sideband is eliminated by filtering.

Figure 5:
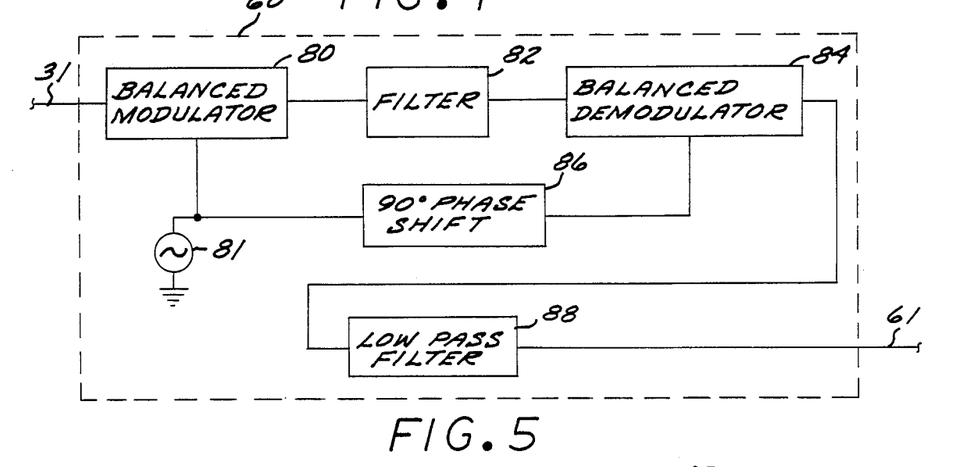
FIG. 5 shows a block diagram of a portion of the system of FIG. 3, which shows one manner of obtaining the quadrature components of the received signal by modulating the received signal to a higher frequency, eliminating one sideband of the modulated signal, demodulating by a phase shifted (90°) voltage of the original modulating frequency, then low pass filtering to eliminate the sum frequency, and returning the single sideband signal to, e.g., the original baseband.

One embodiment of a frequency domain analytic signal processor according to the present invention is shown in FIG. 5, in which the quadrature phase circuit 60 of FIG. 3 is shown, within the phantom lines of FIG. 5, to include a balanced modulator 80 which modulates the received signal on line 31 on a higher carrier frequency supplied by a high frequency oscillator 81. The modulated signal is then filtered in filter 82 to remove either sideband. Either quadrature component may be obtained at baseband by first demodulating the single sideband signal in balanced demodulator 84 with a voltage coherent with the original modulating voltage. The phase shift of this demodulating voltage with respect to the original modulating voltage determines which quadrature component is produced. As shown in FIG. 5, a 90° phase shift occurs in a phase shifting circuit 86. A phase shift of greater or less than 90° may be needed in the phase shifting circuit 86, in order to compensate for the phase shifts in the filter 82. The quadrature components are then low pass filtered in low pass filter 88. These quadrature components are then suitable for processing as discussed above with respect to FIG. 3.

It has been discovered that a particularly useful embodiment of the present invention eliminates the inherent errors caused in conventional analog squaring, summing and square root circuits as are employed in, e.g., FIGS. 3, 4 and 5.

Figure 6:
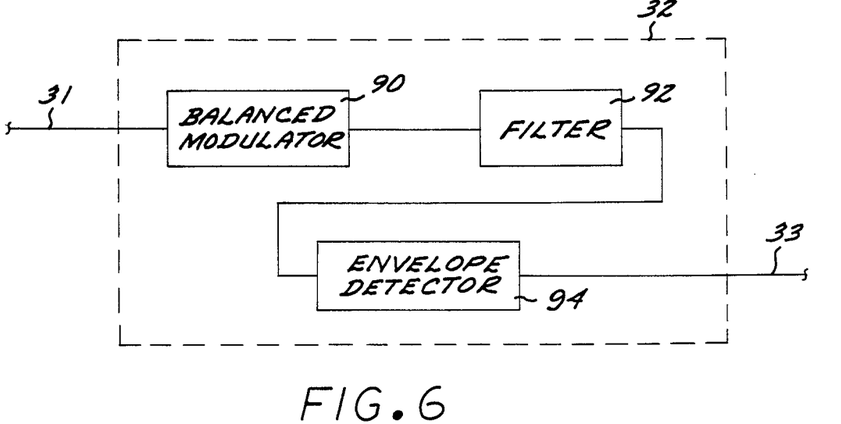
FIG. 6, shows a block diagram of a portion of the system of FIG. 1 in which the analytic signal is generated by modulating the received signal on a substantially greater frequency carrier, filtering one sideband, and envelope detecting the remaining sideband to generate the envelope of the remaining sideband, which corresponds to the magnitude of the analytic signal.

As shown in FIG. 6, the analytic signal processor 32 can include a very simple analog circuit for producing the analytic signal from the received signal on line 31. A balanced modulator 90 modulates the received signal on line 31 on a carrier frequency of substantially greater frequency than the received signal. As an example, the carrier frequency should be at least about six times and preferably ten or more times the received signal frequency. This modulated signal is filtered in filter 92 to remove the upper or lower sideband about the carrier frequency. The resultant single sideband signal is then envelope detected in envelope detector 94 to generate the envelope of the single sideband signal, which is proportional to the analytic signal magnitude and is input on line 33 to analytic signal identifier detector 34 (shown in FIG. 1). In an alternative embodiment (not shown in FIG. 6) the heterodyned signal from modulator 90 is put through a conventional analog circuit to phase shift one sideband +90° and one sideband $-90°$, which corresponds to multiplying the heterodyned signal by i sgn(f) in the frequency domain. By coherent demodulation similar to that shown in FIG. 5 with demodulation by a frequency coherent with the original modulation frequency used in modulator 90, the received signal quadrature components are produced, i.e., the Hilbert Transform is carried out.

In this embodiment the only coherency required is that between the modulating and demodulating frequencies and even that is not required to merely extract the analytic signal magnitude.

By way of example of a circuit of the kind shown in FIGS. 1 and 3 taken together (with respect to quadrature components) and FIGS. 1 and 6 taken together, a prototype was constructed employing a modulator 90 having a carrier frequency of 50 MHz to translate the ultrasonic received signal in a medical-type ultrasonic sonar unit. The sonar unit consisted of a Panametrics model 5052-PR pulser-receiver unit 20 with a 2.25

MHz, 12.7 mm diameter transducer 22. It will be understood, however, that with suitable electronic modifications, principally to the modulators and filters, other transducers and sonar units of higher or lower frequency could be employed.

Figure 7:
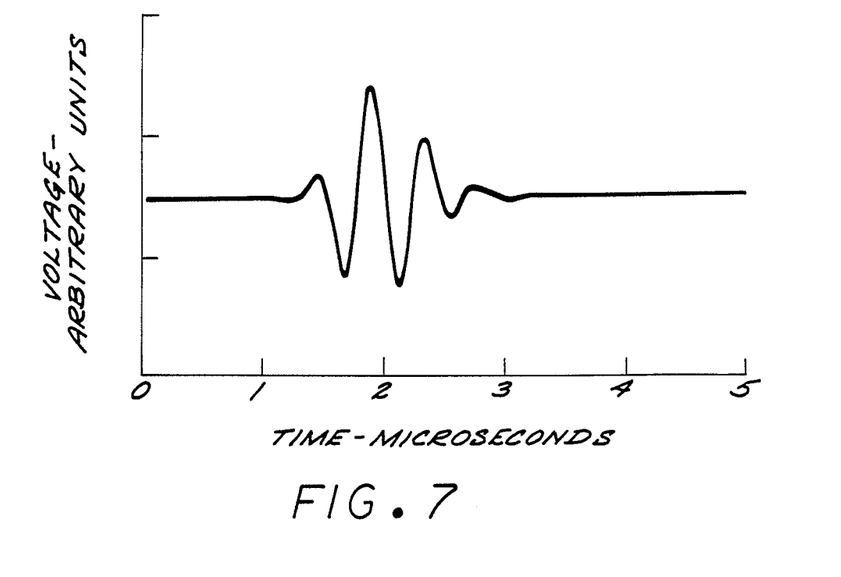
FIG. 7 shows one quadrature component of an echo signal from a single reflector interface, obtained by coherent demodulation of the single sideband of the received echo signal.
Figure 8:
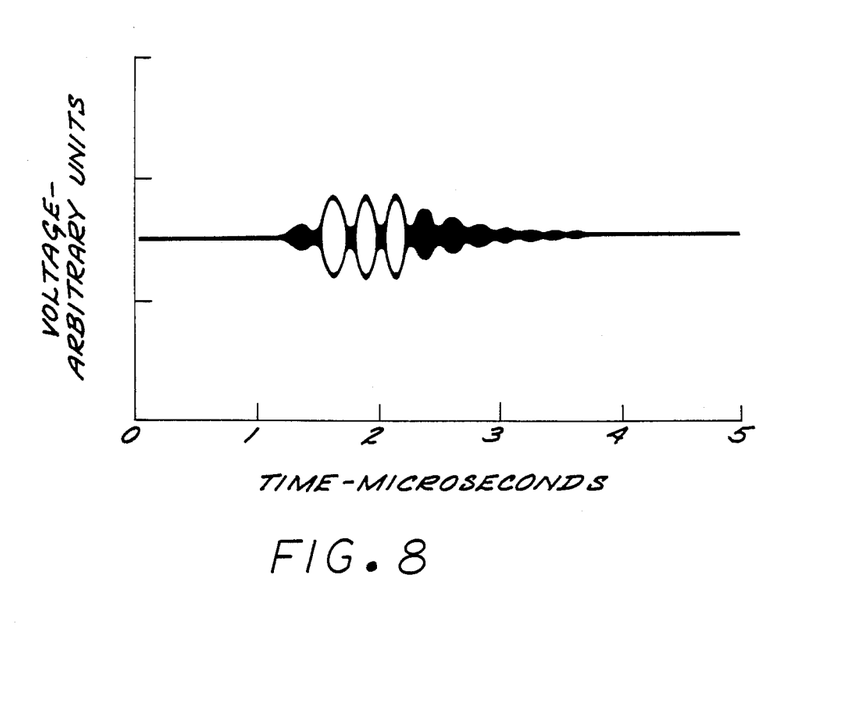
FIG. 8 shows a double sideband modulated echo signal from the same single reflector which gave the signal in FIG. 7.
Figure 9:
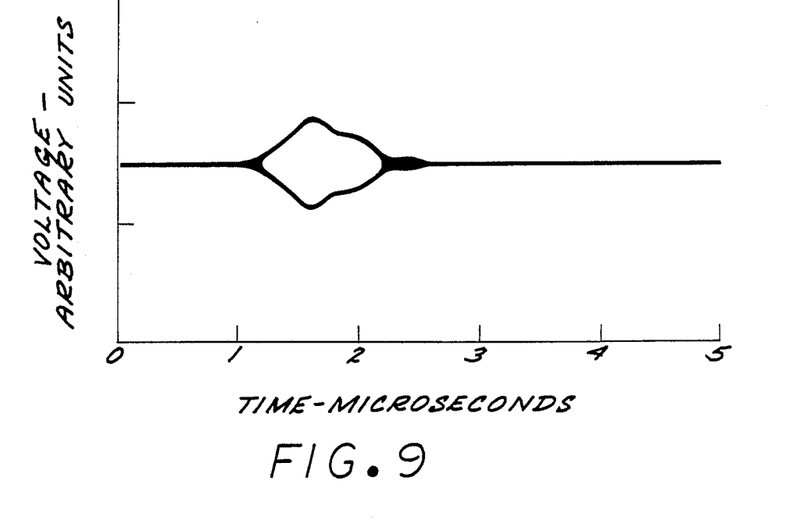
FIG. 9 shows a single sideband modulated echo signal from the same single reflector which gave the signal in FIG. 7.
Figure 10:
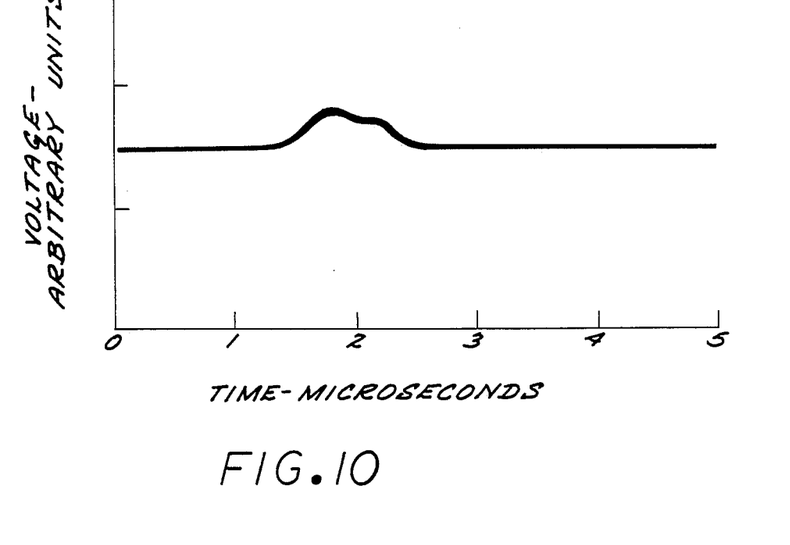
FIG. 10 shows a rectified single sideband echo signal from the same single reflector, which gave the signal in FIG. 7, and which rectified single sideband signal constitutes the analytic signal magnitude.

In the prototype unit, echos were first received from a target 26 comprising a flat plate of acrylic plastic, e.g., "Lucite", "Plexiglas" or "Perzsex", immersed in the water of the container 24. FIGS. 7–12B are illustrations of photographs taken of oscilloscope representations of various signals and voltages present in portions of the circuits of the present invention. FIG. 7 shows the component of the analytic signal which is in phase with the unprocessed ultrasonic echo received in the pulser-receiver 20 and output on line 31. FIG. 8 shows the signal output of the modulator 90 which is double sideband modulated on the 50 MHz carrier. The maxima of the signal shown in FIG. 8 correspond to both the positive and negative peaks of the signal of FIG. 7. FIG. 9 shows the envelope of the single sideband signal output of the filter 92, which envelope is the output of envelope detector 94. Shown in FIG. 10 is the rectified version of the envelope in FIG. 9, which is employed to facilitate peak detection. That the zeroes of the Hilbert Transform of a signal occur at the same time as the extrema of the original signal has been pointed out by Heyser in the paper "Some Useful Graphical Relationships" *J. Audio Engineering Society*, Vol. 23, (1975) pages 562–65.

The use of the Hilbert Transform to locate maxima of signals has recently been pointed out by Cabot in a paper entitled "A Note on the Application of the Hilbert Transform to Time Delay Estimation" in the *IEEE Trans.* Vol. ASSP-29 (June 1981) pages 607–609. It should be noted, however, that Cabot does not show the use of the analytic signal magnitude as in the disclosure of the present invention nor the relation of the analytic signal to arriving signal energy.

Figure 11A:
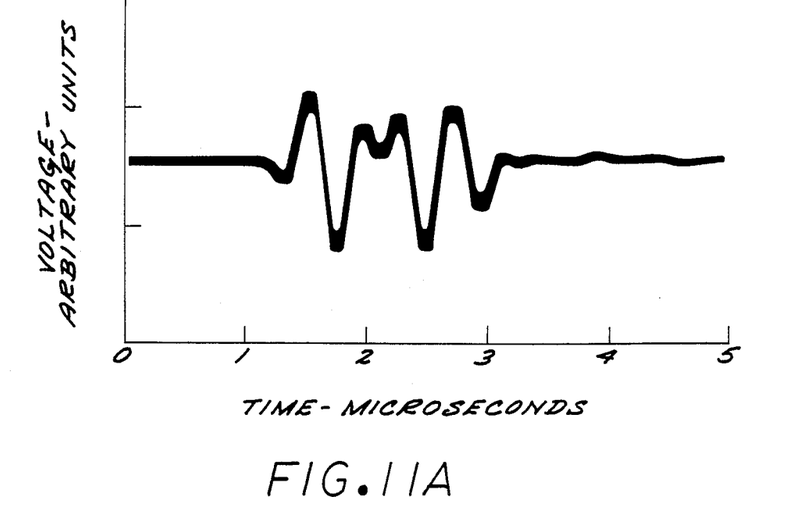
FIGS. 11A and 11B show echoes from closely spaced interfaces after coherent modulation and demodulation, with 11A representing one component of the analytic signal and 11B representing the component in quadrature with the component of 11A; and, FIGS. 12A and 12B show signals from a received signal resulting from separate echoes from the same closely spaced interfaces, which gave the signal in FIGS. 11A and B, with 12A representing the analytic signal magnitude obtained by peak detection of the envelope of the single sideband signal and 12B representing the result of conventional full wave rectification and low pass filtering.
Figure 11B:
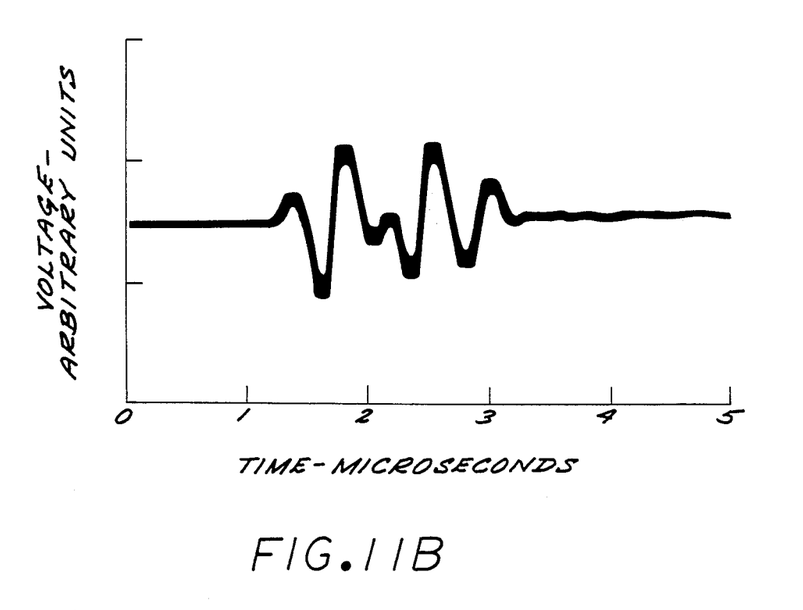
Figure 12A:
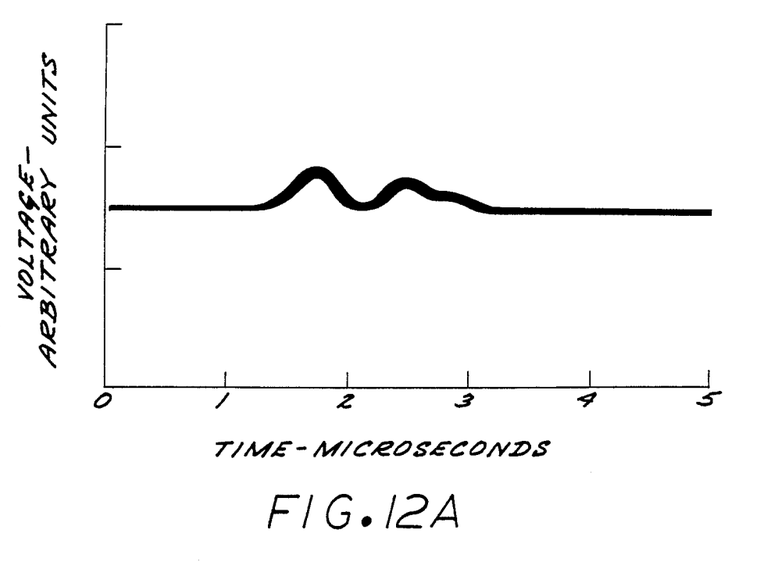
Figure 12B:
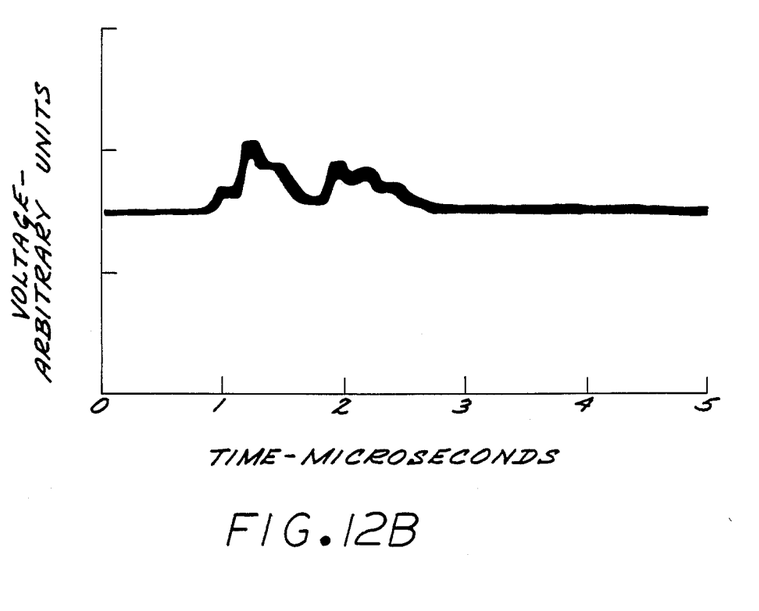

FIG. 11A shows a representation of a received signal having multiple echos. In FIG. 11B is represented the phase shifted signal in quadrature with the signal shown in FIG. 11A and illustrates that the interface echo peaks occur in different locations when the phase shift is performed. FIG. 12A illustrates the rectified analog analytic signal produced according to the present invention. It can be seen that this signal, representing multiple echo returns, gives two well defined and smooth analytic signal peaks, each representing a separate return echo. Comparing this to the signal represented in FIG. 12B, with the received signal from the same target 26 as in FIG. 12A, but conventionally rectified, it can be seen that a plurality of definable peaks occurs for each echo in the signal representation of FIG. 12B. Even with conventional smoothing, the location of the true peak, or the interference between the two echo return signals, is not as well determined, or resolved, as with the employment of the analytic signal according to the present invention.

In the prototype unit the modulator 90 was a Mini-Circuits Lab double balanced Mixer Model No. ZAD-1-1. Filter 92 was an I-TEL FTB/20-50/4-8/50-1A eight pole 4 MHz bandwith 50 MHz center frequency filter. Envelope detector 94 was a full wave rectifier using a center tapped transformer secondary, e.g., as shown in the 1977 Radio Amateurs Handbook p. 237, slightly modified to eliminate the output coupling capacitor and to add sufficient bias to the rectifier diodes to place them sufficiently into the conduction region.

SUMMARY OF THE SCOPE AND ADVANTAGES OF THE INVENTION

The present invention has great utility in all facets of imaging or ranging systems, e.g., radar, sonar and laser pulse-echo systems. Comparison of the analytic signal with a synchronizing pulse to determine range information gives a signal which is relatively smooth and free from interference between the signal frequency and adjacent echos, e.g., spatially close reflecting interfaces. While identification of the analytic signal from the received signal by digital means has been previously disclosed, the present invention relates to the utilization of the identified analytic signal in pulse-echo imaging and ranging systems. In addition, the present invention relates to a totally analog circuit for deriving the analytic signal from a received radio frequency signal and processing the derived analytic signal in pulse echo ranging and imaging systems. The analog circuit implementation has a number of advantages over digital implementation. This enables real time analysis of the received signal and avoids the time delay of analog-to-digital conversion and the expense of equipment for doing so, along with the relatively large data processing memory capability needed to digitally compute the analytic signal, and other limits on digital analysis techniques in the present art.

It will also be understood that the present invention is useful both for A-scan and imaging applications for echo-pulse systems. The present invention can be used for imaging by well known techniques, not related to the presently-disclosed signal processing apparatus and method, e.g., by employing means for determining the transducer angle and means for correlating the range information from various angles into an image, as both are well known in the art.

Further, it is not only the peak of the analytic signal that is useful for ranging and imaging information. If, e.g., a Hilbert Transform is again performed on the analytic signal magnitude produced according to the present invention, then a zero-crossing will correspond to the peak location in the untransformed analytic signal. Thus, the zero-crossing could be the information bearing part of the transformed analytic signal. Also, currently known so-called "grey scale imaging" techniques available for making use of ranging data information at other than the peak of the untransformed analytic signal.

It will further be understood by those skilled in the art that the present invention may be utilized in extracting useful information from passively received signals, such as passive sonar signals and sound energy received from a source such as a crack in a piece of material, e.g., for use in fracture analysis or non-destructive metallurgical testing. In such a system, the energy released by the signal source is related, as taught by Heyser, to the analytic signal magnitude. The present invention is thus useful in extracting information from the received signal to measure the energy characteristics present in the received signal. One reason that the present invention is so useful is that, in the analog implementation, the identification of the analytic signal components does not depend upon any coherency with a transmitted and reflected echo pulse.

These and other modifications to the present invention would be appreciated by those skilled in the art and can be made without detracting from the scope and spirit of the invention. Applicant intends to cover all

What is claimed is:

1. A pulse-echo or passive listening response system for indentifying one or more closely spaced interfaces of a target wherein an unprocessed signal is received by the system's receiver either after a pulsed signal from the system has struck the target and has been reflected by one or more of the target's interfaces, or by passive reception, wherein the response system is characterized by the received signal being a multi-frequency signal which occupies a given bandwidth, which received signal is then processed by said system to identify a particular portion of the processed signal which is useful for locating the target interface (s), the system comprising:

(1) a signal receiving means at the system's receiver for receiving said unprocessed signal, which received signal contains information proportional to the rate of arrival of energy at the receiver and is indicative of the location of said target's interface (s);

(2) a signal processing means, connected to said signal receiving means, for processing said received unprocessed signal by a constant phase-shift while leaving the relative amplitude of all phase-shifted frequency components of the multifrequency signal unchanged and to produce therefrom a pair of signals which together represent the complete complex analytic signal from which the location of the target interface(s) can be identified; said signal processing means comprising:

(a) a signal separation means connected to receive said unprocessed signal for separating said received signal into two signals in two channels;

(b) phase shifting means connected to receive both of said separated signals in said channels for subjecting the signal in each channel to a constant phase shift (i.e., a phase shift which is the same for all frequency components in that channel), the constant phase shift differing between the two channels by 90 degrees and therefore resulting in the processed signals of the two channels being Hilbert transforms of each other; and (3) means forming a representation of said analytic signal from said processed signal in order to identify said particular portion from the representation whereby the target interface(S) may be located.

2. The apparatus of claim 1 wherein the received and unprocessed signal is analog and the signal processing means comprises:

an analog-to-digital conversion means for converting said received analog signal to a digital representation thereof; and, data processing means, coupled to the analog-to-digital conversion means, and responsive to the digital representation of the converted analog signal for producing said representation of said analytic signal.

3. The apparatus of claim 2 wherein the data processing means comprises means for performing a Fourier Transform on said digital representation.

4. The apparatus of claim 2 wherein said data processing means comprises an array processor.

5. The apparatus of claim 1 wherein the received signal is analog and said signal processing means comprises all-analog circuit means for obtaining the analytic signal from the received analog signal.

6. The apparatus of claim 5 wherein said particular portion of said analytic signal is the signal's magnitude and said all-analog circuit means comprises:

phase circuit means responsive to said analog signal for producing two phase-shifted signals which, at all frequencies of interest, possess the same amplitude as each other, the amplitude being proportional to the amplitude of the unprocessed signal, and are 90 degrees different in phase from each other, each differing from the unprocessed signal by its own frequency-independent phase (one of these two signals could be the original unprocessed signal itself);

sparing means having a pair of input terminals with each input terminal coupled to receive and separate one of the above-produced phase-shifted analog signals for producing a pair of squared output signals; and summing means, coupled to the squaring means, and responsive to said pair of squared signals for producing the sum of the squares of each of the individual signals, which sum represents the square of the magnitude of the analytic signal.

7. The apparatus of claim 6 wherein the phase circuit means comprises:

a Hilbert Transform circuit.

8. The apparatus of claim 7 wherein the Hilbert Transform circuit comprises an all-pass, non-minimal-phase circuit.

9. The apparatus of claim 8 wherein the Hilbert Transform circuit comprises a "Dome" circuit.

10. The apparatus of claim 7 wherein the Hilbert Transform circuit comprises:

delay line tapping means for tapping the received analog signal at selected intervals and produced a plurality of delay line tap signals which include a middle tap;

weighting means, coupled to the delay line tapping means, for weighting said plurality of delay line tap signals to approximate the function $1/t - t_o$, where to is the time of the middle tap and it is the time of tap being weighted, and for producing at the output thereof a plurality of weighted signals, and, weighted signal summing means, coupled to the weighting means, for summing the plurality of weighting signals.

11. The apparatus of claim 6 and further comprising:

means for deriving the square root of the signal from said summing means to provide the magnitude of the analytic signal.

12. The apparatus of claim 5 wherein said all-analog circuit comprises:

modulating means for modulating said received analog signal on a higher frequency carrier signal;

filter means, coupled to the modulating means and responsive to the output signal therefrom, for filtering the modulated signal to remove one sideband on either side of the carrier to thus produce a single sideband signal, and, demodulating means, coupled to the filter means, for demodulating said single sideband signal to produce either:

(a) a pair of signals that are shifted 90 degrees with respect to each other and are thereby the Hilbert Transforms; or (b) a single signal that is phase shifted 90 degrees with respect to the original unprocessed signal and therefore is its Hilbert Transform.

13. The apparatus of claim 2 and further comprising:
digital-to-analog conversion means coupled to said data processing means for converting the digital analytic signal back to an analog form.

14. The apparatus of claim 1 wherein the signal processing means comprises:
modulating means for modulating the received radio frequency signal on a higher frequency carrier signal;
filter means for isolating one sideband of the modulated received radio frequency signal from the other sideband of the modulated received signal and from the carrier frequency; and
demodulating means, connected to said filter means, which demodulates the single sideband signal to produce either:
(a) a pair of signals that are shifted 90 degrees with respect to each other and thereby are Hilber Transforms; or
(b) a single signal that is phase shifted 90 degrees with respect to the original unprocessed signal and therefore is its Hilbert Transform.

15. The apparatus of claim 1 wherein a reference is provided and said particular portion of said analytic signal is the signal's magnitude, and wherein said signal processing means further comprises:
means for comparing the location of the maxima of said magnitude relative to said reference as an improved estimator of the location of said target interface(s).

16. The apparatus of claim 15 wherein the location of the target interface(s) relative to said reference signal is ranging data information, and said comparing means is a signal range information identifier, and wherein said range information identifier comprises:
means for receiving an electrical signal which represents said reference;
peak locating means for providing an electrical output signal which is indicative of the peak of the amplitude of said analytic signal magnitude; and
means responsive to said receipt of said reference-representing signal and the signal indicative of the amplitude peak of said analytic signal magnitude for computing therefrom the range of said target interface(s) relative to said reference.

17. The system of claim 15 wherein the location of the target interface(S) relative to said reference is ranging data information, and said systems comparing means is an analytic signal range information identifier, and wherein said range information identifier comprises:
means for receiving an electrical signal which represents said reference;
a Hilbert transform means for transforming the magnitude of said analytic signal to produce a zero crossing in the transformed analytic signal which corresponds to the maxima of the magnitude of the untransformed analytic signal; and
means responsive to said reference-representing signal and the zero crossing of said transformed analytic signal for computing therefrom the range of said target interface(s) relative to said reference.

18. The apparatus of claim 15 and further comprising:
analytic signal detection means for detecting the occurrence of ranging data information from the peak(s) of the magnitude of the analytic signal; and
timing means, coupled to the analytic signal detection means, for determining target interface arrival times by comparison of the occurrence of the peak(s) of said analytic signal relative to said reference.

19. The apparatus of claim 14 and further comprising:
squaring means wherein the two signals which are Hilbert Transforms of each other are individually squared; and
summing means for summing the squares and thereby producing the square of the analytic signal magnitude.

20. The apparatus of claim 19 and further comprising:
means for taking the square root of the squared sum to produce the magnitude of the analytic signal.

21. A method of obtaining time of arrival information from a received unprocessed signal in a pulse-echo or passive listening system said method comprising the steps of:
(1) receiving an unprocessed multi-frequency signal occupying a given amount of bandwidth;
(2) obtaining a representation of the magnitude of an analytic signal which is derived solely from the received unprocessed signal by the sub-steps of:
(a) dividing the received unprocessed signal into a pair of multi-frequency signals each having said given amount of bandwidth;
(b) convolving one signal of the pair by the kernel $1/t - t_o$;
(c) leaving the other signal of the pair unchanged in amplitude;
(d) squaring each signal of the pair;
(e) summing the squared results; and
(3) obtaining the time of arrival information from the representation of the magnitude of said analytic signal as processed in accordance with substeps 2(a) through 2(e) of step 2 above.

22. A pulse-echo or passive listening system for identifying one or more closely spaced interfaces of as target wherein an unprocessed signal is received by the system's receiver either after a pulsed signal from the system has struck the target and has been reflected by one or more of the target's interfaces, or by passive reception, wherein the system is characterized in that the received signal is a multi-frequency signal occupying a given bandwidth, which received signal is then processed by said system to identify a particular portion of the processed signal in order to locate the target interface(s), the system comprising:
(1) a signal receiving means at the system's receiver for receiving said unprocessed signal, which received signal contains information proportional to the rate of arrival of energy at the receiver and is indicative of the location of said target's interface(s);
(2) a signal processing means, connected to said signal receiving means for processing aid received unprocessed signal by frequency translation in order to directly produce the magnitude of an analytic signal from which the location of the target interface (s) or time of arrival can be identified; said signal processing means comprising:
(a) modulating means for modulating the received unprocessed signal on a higher frequency carrier signal;
(b) filter means, coupled to the modulating means, for removing one sideband on either side of the carrier signal to produce a single sideband signal; and
(c) envelope detecting means, coupled to the filter means, for recovering the envelope of the single sideband signal, which envelope is directly proportional to the magnitude of the analytic signal; and (3) means for representing said magnitude as an optimal estimator for identification of the target interface (s) or time of arrival.

23. A pulse-echo or passive listening system for identifying one or more closely spaced interfaces of a target wherein an unprocessed signal is received by the system's receiver either after a pulsed signal from the system has struck the target and has been reflected by one or more of the target's interfaces, or by passive reception, wherein the system is characterized in that the received signal is a multi-frequency signal occupying a given bandwidth, which received signal is then processed by said system to identify a particular portion of the processed signal in order to locate the target interface(s), the system comprising:
(1) a signal receiving means at the system's receiver for receiving said unprocessed signal, which received signal contains information proportional to the rate of arrival of energy at the receiver and is indicative of the location of said target's interface(s);
(2) a signal processing means, connected to said signal receiving means for processing said received unprocessed signal by frequency translation in order to directly produce the magnitude of an analytic signal from which the location of the target interface (s) or time of arrival can be identified; said signal processing means comprising:
  (a) modulating means for modulating the received unprocessed signal on a higher frequency carrier signal;
  (b) filter means, coupled to the modulating means, for removing one sideband on either side of the carrier signal to produce a single sideband signal; and
  conversion means, couple to the filter and modulating means, for converting the single sideband signal back to baseband, and being either in phase with the original baseband signal, in quadrature therewith; and
(3) means for representing said magnitude as an optimal estimator for identification of the target interface(s).

24. Apparatus for obtaining time of arrival information from a received unprocessed signal in a pulse-echo or passive listening system, said apparatus comprising:
(1) means for receiving an unprocessed multifrequency signal which occupies a given amount of bandwidth;
(2) means for obtaining a representative of the magnitude of an analytic signal which is derived solely from the received unprocessed signal by the sub-apparatus of:
  (a) dividing means for dividing the received unprocessed signal into a pair of multi-frequency signals each having said given amount of bandwidth
  (B) means for convolving one signal of the pair by the kernel $1/(t-t_o)$, while leaving the other signal of the pair unchanged in amplitude;
  (c) squaring means for squaring each signal of the pair;
  (d) means for summing the squared results; and
(3) means for obtaining the time of arrival information from the representation of the magnitude of said analytic signal as processed by the sub-apparatus of 2(a) through 2(d) above.

25. A pulse-echo or passive listening system for identifying one or more closely spaced interfaces of a target wherein an unprocessed signal is received by the system's receiver either after a pulsed signal from the system has struck the target and has been reflected by one or more of the target's interfaces, or by passive reception, wherein the system is characterized in that the received signal is a multi-frequency signal occupying a given bandwidth, which received signal is then processed by said system to identify a particular portion of the processed signal in order to locate the target interface(S), the system comprising:
(1) a signal receiving means at the system's receiver for receiving said unprocessed signal, which received signal contains information proportional to the rate of arrival of energy at the receiver and is indicative of the location of said target's interface(s);
(2) a signal processing means, connected to said signal receiving means for processing said received unprocessed signal by a constant phase-shift while leaving the relative amplitude of all phase-shifted frequency components of the multi-frequency signal unchanged and to produce therefrom a complete complex analytic signal from which the location of the target interface(s) can be identified; said signal processing means comprising:
  (a) phase circuit means, for obtaining a pair of signals which, at all frequencies of interest, possess the same amplitude as each other, the amplitude being proportional to the amplitude of unprocessed signal, and are 90 degrees different in phase from each other, each differing from the unprocessed signal by its own frequency-independent phase;
  (b) squaring means, coupled to the phase circuit means, for producing a pair of squared phase different signals; and,
  (c) summing means, coupled to the squaring means, for summing the signals representative of the squared phase-different signals, and for producing a signal representative of the sum of the squares thereof which directly includes the magnitude of the analytic signal; and
(3) means for representing said magnitude as an optimal estimator for identification of the target inter-face(s).

26. In a system which receives an unprocessed signal having properties of multiple reflections, multiple sources, or multiple propogation paths that are difficult to analyze from said received and unprocessed signal, the improvement comprising:
analog signal processing means, for obtaining the magnitude of an analytic signal derived from said received signal, and said analog signal processing means including:
  (a) modulating means for modulating the received signal on a carrier signal having a frequency substantially greater than that of the received signal;
  (b) filter means, coupled to the modulating means, for removing one sideband, on either side of the carrier, thereby producing a single sideband signal; and
  (c) envelope detection means, coupled to the filter means, for detecting the envelope of the single sideband signal, and for generating a signal representative of the envelope of the single sideband signal.

27. In a system which received an unprocessed signal having properties of multiple reflections, sources, or propogation paths that are difficult to analyze from said received signal, the method improvement comprising:
receiving said unprocessed signal;
obtaining the magnitude of an analytic signal which is derived directly from the received radio frequency signal by:

(a) modulating the received radio frequency signal on a carrier signal;
(b) filtering the modulated signal to remove a sideband, on either side of the carrier signal frequency, to obtain a single sideband signal, and
(c) converting the single sideband signal down to obtain a pair of signals differing by 90° in phase from each other 28. A method of processing a received radio frequency signal in a pulse-echo imaging or ranging system, comprising the steps of:

receiving said radio frequency signal;

obtaining the magnitude of an analytic signal derived from the received signal by:

(a) modulating the received radio frequency signal on a carrier signal having a frequency substantially higher than the frequency of the received radio frequency signal;
(b) filtering the modulated signal to remove a sideband on either side of the carrier frequency to obtain a single sideband signal; and
(c) envelope detecting the single sideband signal to produce the envelop of the single sideband signal; and thereafter detecting the occurrence of ranging data information from the magnitude of the envelope of the single sideband signal.

* * * * *

UNITED STATES PATENT AND TRADEMARK OFFICE
CERTIFICATE OF CORRECTION

PATENT NO. : 4,837,578

DATED : June 6, 1989

INVENTOR(S) : Paul M. Gammell

It is certified that error appears in the above-identified patent and that said Letters Patent is hereby corrected as shown below:

Column 1, line 43, "analytic" should read --Analytic--.

Column 1, line 43, "signal" should read --Signal--.

Column 1, line 43, "magnitude" should read --Magnitude--.

Column 1, lines 43 and 44, "Ultrasonics" should be italicized.

Column 1, line 47, after "Gabor," should be --is--.

Column 1, line 63, after ""Determination" should be --of--.

Column 1, line 65, after "at" should be --902-05 (1971) (hereinafter--.

Column 2, lines 5 and 6, "Journal of the Audio Engineering Society" should be italicized.

Column 3, line 34, "is envelope" should read --envelope is--.

Column 3, line 40, "a" should read --A--.

UNITED STATES PATENT AND TRADEMARK OFFICE
CERTIFICATE OF CORRECTION

PATENT NO. : 4,837,578

DATED : June 6, 1989

INVENTOR(S) : Paul M. Gammell

It is certified that error appears in the above-identified patent and that said Letters Patent is hereby corrected as shown below:

Column 5, line 21, "be." should read --be--.

Column 6, line 1, "Ultrasonics" should be italicized.

Column 10, line 46, before "available" should be --are--.

Column 17, line 8, after "other" should be --.--.

Column 11, line 48, "(S)" should read --(s)--.

Column 12, line 35, "produced" snould read --producing--.

Column 12, line 41, "to" should read --$t_o$--.

Column 12, line 41, "it" should read --t--.

Column 13, line 48, "system" should read --system's--.

Column 14, line 26, "1/t-$t_o$);" should read --1/(t-$t_o$);--.

UNITED STATES PATENT AND TRADEMARK OFFICE
CERTIFICATE OF CORRECTION

PATENT NO. : 4,837,578

DATED : June 6, 1989

INVENTOR(S) : Paul M. Gammell

It is certified that error appears in the above-identified patent and that said Letters Patent is hereby corrected as shown below:

Column 14, line 53, "aid" should read --said--.

Column 15, line 53, "(B)" should read --(b)--.

Column 16, line 6, "(S)" should read --(s)--.

Signed and Sealed this

Thirteenth Day of November, 1990

Attest:

HARRY F. MANBECK, JR.

Attesting Officer

Commissioner of Patents and Trademarks